Patented Jan. 12, 1943

2,307,891

UNITED STATES PATENT OFFICE 2,307,891

AUTOCONDENSATION PRODUCT OF HIGH MOLECULAR ALKYL ARYL KETONES AND PROCESS FOR PRODUCING IT

Eugene Lieber, West New Brighton, Staten Island, N. Y., assignor to Standard Oil Development Company, a corporation of Delaware No Drawing. Application November 13, 1939, Serial No. 304,137

10 Claims. (Cl. 260—592)

This invention relates to novel condensation products and methods of preparing same and more particularly to a type of condensation product useful as pour depressors in lubricating oils.

It is known that certain fatty acid keto aromatics, which might otherwise be called alkyl aryl ketones, have some slight pour depressor properties; i. e. when added to a mineral lubricating oil in a small amount such as 1 to 2%, they have the characteristic of reducing the pour point of the lubricating oil, as determined by the standard A. S. T. M. methods. However, these materials are relatively weak and ineffective in their pour depressor properties and suffer the additional disadvantage of having only a limited solubility in mineral lubricating oils.

It has now been found and is a primary object of the present invention that these same alkyl aryl ketones can be converted into potent and valuable pour depressors by a relatively simple condensation with a catalyst of the aluminum chloride type at somewhat elevated temperatures.

Another object of this invention is to make pour depressors of improved solubility in mineral lubricating oils.

The ketone falling within the scope of the present invention may be considered as having the general formula R—CO—R', in which R is an aromatic group and R' is an alkyl group having 1 to 20 or more carbon atoms, preferably at least 10 carbon atoms. The aryl group R preferably consists of 1 or 2 aromatic nuclei such as phenyl, naphthyl, diphenyl, and the like, or even higher groups such as anthracene, phenanthrene, etc. The alkyl group R' may be heptadecyl, cetyl, decyl, and the like, or even shorter groups such as hexyl, isobutyl, propyl, and even methyl. Instead of using a single pure compound in preparing the ketone, one may use a mixture such as the mixed fatty acids of relatively high molecular weight which are obtained by oxidation of paraffin wax. These usually average from about 17 to 22 carbon atoms per molecule.

Although the preparation of the ketones per se does not constitute part of the present invention, it may be explained that one method of making such ketones is to treat a fatty acid having the desired number of carbon atoms, e. g. stearic acid, with phosphorus trichloride or thionyl chloride, to form the corresponding acyl chloride and the latter is then reacted with the desired aromatic compounds such as benzene, naphthalene, etc., in the presence of suitable catalysts such as aluminum chloride, at room temperature. The resultant fatty acid keto aromatics may be readily recovered from residual catalysts and any unreacted raw materials.

According to the present invention, such a fatty acid keto aromatic or aryl alkyl ketone, made either by the above procedure or by any other suitable method, is now mixed with a fresh or additional amount of anhydrous aluminum chloride, which is best added slowly at room temperature with suitable agitation, and the reaction mixture is then raised substantially above that normally required for the formation of the ketone. A polymerization, or more properly speaking, a condensation, now takes place and the reaction is continued for a length of time depending upon the temperature of the reaction and the degree of polymerization desired, as determined by preliminary experiments.

The yield and potency of the pour depressor varies somewhat, not only according to the particular ketones used as starting material but also according to the amount of catalyst used and the time and temperature of heating, but in general, it is desired to use about 0.2 to 1.0 mol of aluminum chloride (or other catalyst) to 1 mol of the ketone starting material (corresponding to about 5 to 35% of aluminum chloride by weight in the case of heptadecyl naphthyl ketone) and the temperature should be usually above 150° F., preferably above 212° F., and may be as high as 300° F. or possibly 350° F. The time of heating at the elevated temperature should generally be within the range of about ½ hour to 2 hours although shorter or longer periods may be used.

Instead of aluminum chloride, other Friedel-Crafts type condensation catalysts may be used, such as boron fluoride, zinc chloride, ferric chloride, titanium tetrachloride, boron fluoride, etc., as well as anhydrous hydrogen fluoride.

In carrying out the condensation reaction of this invention, solvents or diluents are not always necessary but may be used if desired. As suitable solvents may be mentioned a kerosene or a relatively high-boiling naphtha, which has been highly refined with concentrated sulfuric acid or with aluminum chloride in order to make them inert, or chlorinated hydrocarbon solvents such as tetrachlorethane, dichlor-benzene, and the like, or even other solvents such as carbon disulfide, nitro-benzene, etc.

The condensation product of this invention is particularly suitable for use as a pour depressor in mineral lubricating oils. For instance, as shown in the data later, the addition of a small amount, such as 2%, of this pour depressor which acts as a wax modifier, will lower the pour point of a mineral lubricating oil which normally has a pour point of +30° F., down to —20° F. or even considerably lower, the potency of the product being dependent to some extent upon the specific conditions used in the condensation.

Although it is primarily intended to use this wax modifier as a pour depressor lubricating oil, it is also useful as an aid for settling, filtering or centrifuging a wax such as from a solution of hydrocarbon wax and an oil in a diluent such as naphtha, as used in dewaxing processes. For such a purpose about 1 to 5% of the wax modifier is used, based upon the estimated amount of wax which is to be separated from the lubricating oil. The wax modifier of this invention is also suitable for improving the texture of a wax, such as paraffin wax, which is to be used for coating paper, etc., in which case the amount of wax modifier to be used should usually be within the range from about 1 to 10% in the total composition of wax and wax modifier.

In the appended claims, the expression "composition comprising a hydrocarbon wax and a wax-modifying agent—" is intended to claim broadly all such compositions in which the novel wax-modifying agent of this invention is used, namely lubricating oils in which it is used as a pour depressor, diluted oil solutions in which it is used as a filter aid or dewaxing aid, and the like, as well as compositions consisting essentially of wax, in which it is used primarily as a texture modifier.

Although the theory of the mechanism of the reactions involved in the present invention is not thoroughly understood, it is believed that the primary condensation reaction may be represented by the following equations. In the case of the monostearyl ketone of benzene (phenyl heptadecyl ketone)

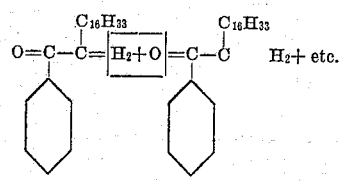

Based on this theory, it is believed that the primary condensation product obtained according to this invention may be represented by the following type of formula.

The case of the stearyl ketone of benzene—

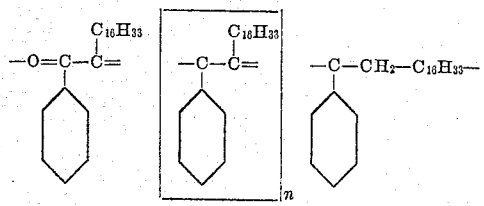

Similarly the following general formula may be used to express the primary condensation product of this invention broadly.

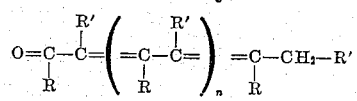

However, in addition to the above primary condensation reaction, it is believed that other condensation reactions are possible and probable. For instance, 3 molecules of the monomer or of a linear polymer of the above described type, in which n is a small integer such as 1 or 3, may combine together by having the carbon atom of the keto group and its adjacent aliphatic carbon atom from ⅓ part of a new 6 carbon atom ring to which will be attached therefor adjacent aromatic and aliphatic groups, as represented in the following graphic formula (in the case of monostearyl benzene):

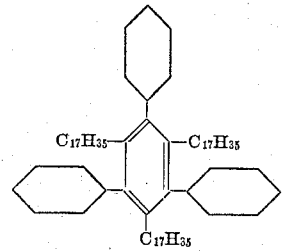

There is a still further possibility of inter-condensation of the molecules through the aromatic nucleus, i. e. by having the oxygen from one molecule combine with one nuclear hydrogen from each of two other molecules. In the case of stearyl benzene, the reaction might be represented as follows:

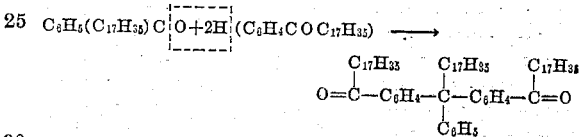

Each of the keto oxygen atoms in the resultant products may presumably continue to condense with two additional molecules through the aromatic nucleus in the same manner with the result that the end product may be represented by the general formula

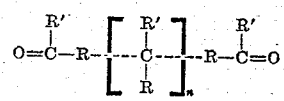

in which R is an aryl group and R' is an alkyl group.

The invention will be better understood from a consideration of the following experimental data. The preparation of stearyl naphthalene (naphthyl heptadecyl ketone) was accomplished as follows:

Two hundred eighty grams of stearic acid were converted to the acid chloride (stearyl chloride) by treating with 80 grams of PCl₃ on the water bath. The resulting stearyl chloride was decanted from the phosphorous acid into a mixture of 128 grams of naphthalene and 500 cc. of solvent contained in a suitable reactor. One hundred thirty-five grams of AlCl₃ was now slowly added with suitable agitation. After the addition of the AlCl₃ the reaction mixture was heated to 220° F. and maintained thereat for 5 hours. After cooling, the reaction mixture was neutralized with a mixture of water and alcohol and diluted with a further 500 cc. of kerosene. After settling, the kerosene extract was distilled with fire and steam to 600° F. to remove low-boiling products (chiefly solvent and unreacted stearic acid). The residue comprised 327 grams of a brownish wax-like solid.

The corresponding monostearyl ketone of benzene (phenyl-heptadecyl ketone) was also prepared from the following proportions of reagents:

| | | |
|---|---|---|
| Stearic acid | grams | 350 |
| PCl₃ | do | 95 |
| Benzene | do | 100 |
| AlCl₃ | do | 166 |
| Solvent | cc. of kerosene | 500 |

Each of the above ketones was then condensed with aluminum chloride under various conditions of temperature and different amounts of aluminum chloride, the results being reported in the table here below showing five different tests, the methods used being described in detail for the first example, as follows:

EXAMPLE 1

Two hundred grams of monostearyl naphthalene, prepared as described above, were placed in a 1-liter-3-necked bottom flask, fitted with a mechanical stirrer and thermometer. Suitable provision, by means of an electrical heater, was made to heat the flask. The stirrer was started and 20 grams of anhydrous aluminum chloride was added to the reaction mixture over a period of 30 minutes. After the addition of the AlCl₃ the reaction temperature was slowly raised to 250° F. (from 20 to 30 minutes) and maintained thereat for one hour. After cooling to about 150° F., the reaction mixture was diluted with 1-liter of kerosene and the aluminum chloride decomposed by pouring into a mixture of alcohol and water.

The materials and other conditions used in the condensation reaction and the yield and pour points of the products formed are summarized in the following table:

Example 6

378 grams of aceto-phenone, C₆H₅COCH₃, were placed in a 1-liter, 3-necked round bottom flask fitted with a mechanical stirrer, thermometer and reflux condenser. The stirrer was started and 113 grams aluminum chloride (30% based on the aceto-phenone used) were slowly added to the reaction flask. After the addition of the aluminum chloride the reaction mixture was slowly heated (30 minutes) to 250° F. At 220° F. vigorous evolution of hydrogen chloride gas began to take place and at 250° F. the reaction mixture turned solid after 10 minutes. It was then diluted with 500 ccs. refined kerosene and the aluminum chloride destroyed by the addition of alcohol and water. After settling, the kerosene extract was distilled to 600° F. with fire and steam in order to remove solvent and other low-boiling products. A bottoms residue comprising 95 grams of a beautiful deep red very viscous oil, somewhat stringy in nature, was obtained as product. This was found to be readily miscible with lubricating oil in all proportions.

The following pour data were obtained:

| | Pour Point, °F. |
|---|---|
| Original oil | +30 |
| Original oil+5% aceto phenone | +30 |
| Original oil+2% polymerized aceo phenone | +25 |
| Original oil+5% polymerized aceto phenone | +15 |

TABLE
*Condensation of R—CO—R' in which R is an aryl group and R' is an alkyl group*

| R | R' | Amt. used (gms.) | | Time (minutes) | | | High temp. °F. | Yield of Polymer (%) | Pour Pt. °F. (2% addt.) Polymer [1] |
|---|---|---|---|---|---|---|---|---|---|
| | | Monomer | AlCl₃ | Adding AlCl₃ | Heating | At high temp. | | | |
| 1. Naphthalene | Stearyl | 200 | 20 | 30 | 20-30 | 60 | 250 | 69 | −20 |
| 2. Naphthalene | do | 200 | 20 | 30 | 20-30 | 120 | 250 | 80 | −25 |
| 3. Benzene | do | 200 | 20 | 30 | 20-30 | 60 | 250 | 83 | −30 |
| 4. Benzene | do | 200 | 40 | 30 | 20-30 | 60 | 250 | 75 | −20 |
| 5. Benzene | do | 200 | 40 | 30 | 20-30 | 120 | 250 | 74 | −25 |

[1] When added to a lubricating oil having a pour point of +30° F. 2% of the monomer in each case gave a pour point of +25° F.

The products in all 5 examples were dark green viscous oils.

The above table of experimental results shows that the preferred condensed or polymerized ketones of this invention are very potent pour depressors, requiring only an addition of 2% to a mineral lubricating oil having a pour point of about 30° F., to reduce the pour point to from −20° F. to −30° F.

Although the invention is intended to apply primarily to the condensation of ketones of the type RCOR' in which R is an aromatic group and R' is an alkyl group having at least 10 carbon atoms, because the condensation products thereof are very potent pour depressors, yet the invention is also intended to include condensation products of ketones which are similar except that the alkyl group R' contains less than 10 carbon atoms, because although the condensation products may not be as potent in pour depressing properties, they also have other valuable properties. As illustrative of such products, the preparation of a condensation product of acetophenone is described herewith:

It is not intended that this invention be limited to any of the particular materials which have been given for sake of illustration only, nor to any theories as to the mechanism of the operation of this invention but only by the appended claims in which it is intended to claim all novelty inherent in the invention as broadly as the prior art permits.

I claim:

1. An auto-condensation product of a ketone having the general formula R—CO—R', in which R is an aromatic group, and R' is an alkyl group having at least 10 carbon atoms.

2. A viscous oily aryl alkyl ketone condensation product having the general formula

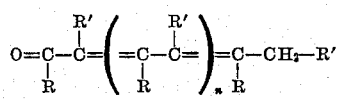

in which R is an aryl group, n is an integer, and R' is an alkyl group having at least 10 carbon atoms.

3. A process which comprises subjecting to auto-condensation an aryl alkyl ketone in which the alkyl group contains at least 10 carbon atoms with a Friedel-Crafts type catalyst at a temperature above 150° F.

4. A synthetic lubricant prepared essentially according to the process of claim 3.

5. An auto-condensation product of a ketone having the general formula R—CO—R', in which R is a phenyl group and R' is an alkyl group having at least 10 carbon atoms.

6. An auto-condensation product of a ketone having the general formula R—CO—R', in which R is a naphthyl group and R' is an alkyl group having at least 10 carbon atoms.

7. An auto-condensation product of a ketone having the general formula R—CO—R', in which R is an aromatic group and R' is a heptadecyl group.

8. An auto-condensation product of a high molecular weight fatty acid aryl ketone.

9. An auto-condensation product of heptadecyl phenyl ketone.

10. An auto-condensation product of a paraffin wax fatty acid aryl ketone.

EUGENE LIEBER.